(12) United States Patent
Tanabe

(10) Patent No.: US 9,672,392 B2
(45) Date of Patent: Jun. 6, 2017

(54) COMMUNICATION DEVICE, CONTROL METHOD FOR COMMUNICATION DEVICE, AND PROGRAM

(71) Applicant: CANON KABUSHIKI KAISHA, Tokyo (JP)

(72) Inventor: Akihiro Tanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/962,111

(22) Filed: Dec. 8, 2015

(65) Prior Publication Data

US 2016/0171260 A1    Jun. 16, 2016

(30) Foreign Application Priority Data

Dec. 11, 2014  (JP) ................. 2014-251269

(51) Int. Cl.
| | |
|---|---|
| *H04Q 5/22* | (2006.01) |
| *G06K 7/10* | (2006.01) |
| *H04W 4/00* | (2009.01) |
| *H04W 36/14* | (2009.01) |
| *H04W 48/16* | (2009.01) |
| *H04W 88/06* | (2009.01) |

(52) U.S. Cl.
CPC ........ *G06K 7/10297* (2013.01); *H04W 4/008* (2013.01); *H04W 36/14* (2013.01); *H04W 48/16* (2013.01); *H04W 88/06* (2013.01)

(58) Field of Classification Search
CPC .. G06K 7/10297; H04W 4/008; H04W 48/16; H04W 36/14; H04W 88/06

USPC .......... 340/10.51, 5.8, 5.83; 455/41.1, 41.2; 726/3, 7
See application file for complete search history.

(56) References Cited

U.S. PATENT DOCUMENTS

| | | | |
|---|---|---|---|
| 9,100,064 B2 * | 8/2015 | Griffin | ..................... H04B 5/02 |
| 2009/0111378 A1 * | 4/2009 | Sheynman | ............ H04W 8/005 455/41.1 |
| 2016/0042207 A1 * | 2/2016 | Inotay | ................ G06K 7/10257 340/5.8 |

FOREIGN PATENT DOCUMENTS

JP        2014-131108 A       7/2014

* cited by examiner

*Primary Examiner* — Dhaval Patel
(74) *Attorney, Agent, or Firm* — Canon U.S.A., Inc. IP Division

(57) ABSTRACT

A communication device includes a first wireless communication unit that repeatedly reads out, via near-field wireless communication, data recorded in a tag of an external device, a memory unit that temporarily holds identification information of the external device included in the data read out by the first wireless communication unit, a control unit that determines, in response to another readout of data by the first wireless communication unit, whether identification information included in the data read out by the first wireless communication unit and the identification information temporarily held by the memory unit represent the same external device, and a second wireless communication unit that wirelessly communicates with the external device via a different communication method from the near-field wireless communication.

20 Claims, 11 Drawing Sheets

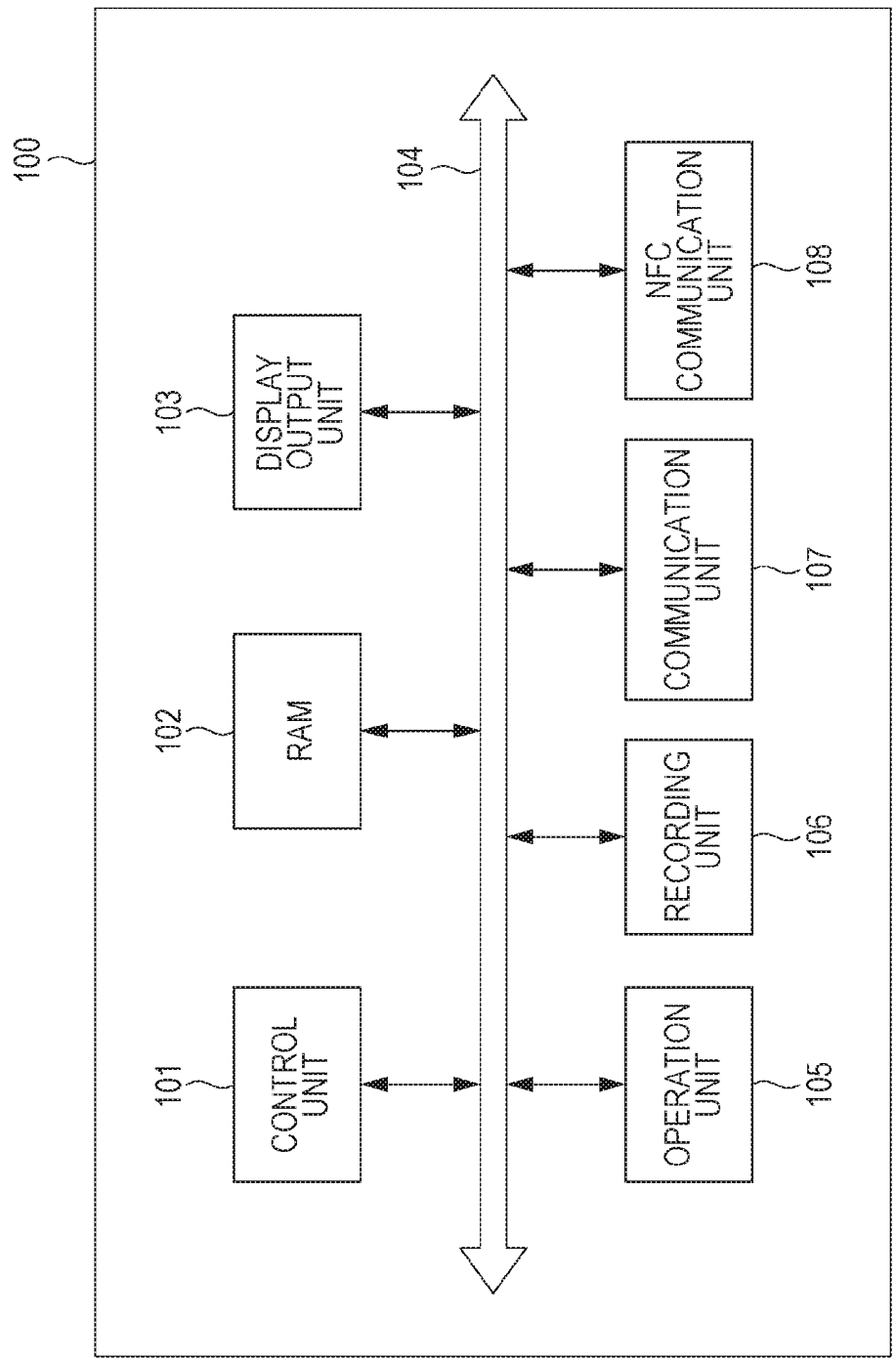

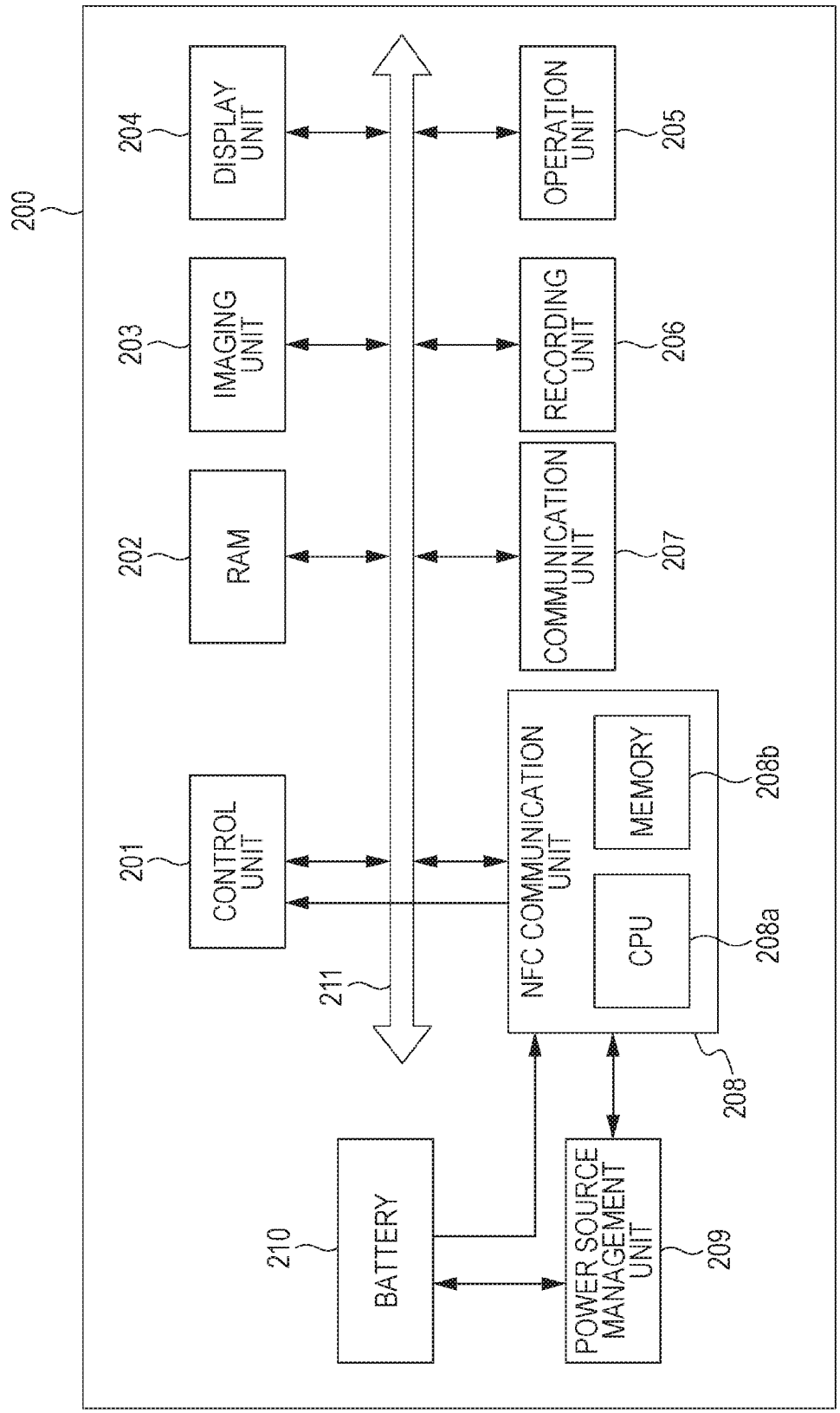

COMMUNICATION DEVICE, CONTROL METHOD FOR COMMUNICATION DEVICE, AND PROGRAM

BACKGROUND

Field

Aspects of the present invention generally relate to a device that can communicate with another device through near-field wireless communication.

Description of the Related Art

A mechanism called handover has recently been suggested as a method that facilitates the setting to connect to wireless LAN or Bluetooth®. Handover first uses the communication method with a narrow communicable range such as the near field communication (NFC) to exchange information required for authentication between devices and then changes the communication method to the method with a wider communicable range such as the wireless LAN.

For example, Japanese Patent Application Laid-Open No. 2014-131108 has disclosed the handover by which the wireless LAN communication is established between the digital camera and the mobile phone through the NFC. According to Japanese Patent Application Laid-Open No. 2014-131108, just placing the digital camera and the mobile phone closer to each other can start the handover because the mobile phone constantly outputs a reading request through the NFC.

Starting the communication just by placing the devices close to each other is very simple but may cause the inconvenience. For example, if the devices remain close to each other after the necessary communication, the communication is attempted over and over. In Japanese Patent Application Laid-Open No. 2014-131108, leaving the devices close to each other after the handover to the wireless LAN results in another near-field wireless communication with the digital camera, in which case the power is wasted.

SUMMARY

A communication device includes a first wireless communication unit configured to, via near-field wireless communication, repeatedly read out data recorded in a tag of an external device, a memory unit configured to temporarily hold identification information of the external device included in the data read out by the first wireless communication unit, a control unit configured to determine, in response to another readout of data by the first wireless communication unit, whether identification information included in the data read out by the first wireless communication unit and the identification information temporarily held by the memory unit represent the same external device, and a second wireless communication unit configured to wirelessly communicate with the external device via a different communication method from the near-field wireless communication, wherein when it is determined that the identification information included in the data read out by the first wireless communication unit after communication with the external device through the second wireless communication unit is disconnected represents the same external device as the external device represented by the identification information temporarily held by the memory unit, the control unit controls the first wireless communication unit so that data causing the external device to do a predetermined operation is not written to the tag of the external device, and when it is determined that the identification information included in the data read out by the first wireless communication unit after communication with the external device through the second wireless communication unit is disconnected does not represent the same external device as the external device represented by the identification information temporarily held by the memory unit, the control unit controls the first wireless communication unit so that data causing the external device to do a predetermined operation is written to the tag of the external device.

Further features of the present disclosure will become apparent from the following description of exemplary embodiments with reference to the attached drawings.

BRIEF DESCRIPTION OF THE DRAWINGS

FIG. 2A is a block diagram illustrating an example of a configuration of a communication device in the first embodiment.

FIG. 2B is a block diagram illustrating an example of a configuration of an electronic appliance in the first embodiment.

DESCRIPTION OF THE EMBODIMENTS

Embodiments for carrying out aspects of the present invention are hereinafter described with reference to the attached drawings.

The embodiments to be described below correspond to examples for achieving aspects of the present invention, and various changes and modifications can be made in accordance with the structure of the device to which aspects of the present invention are applied and various conditions. The embodiments can be implemented in combination as appropriate.

First Embodiment

System Configuration Diagram

Figure 1:
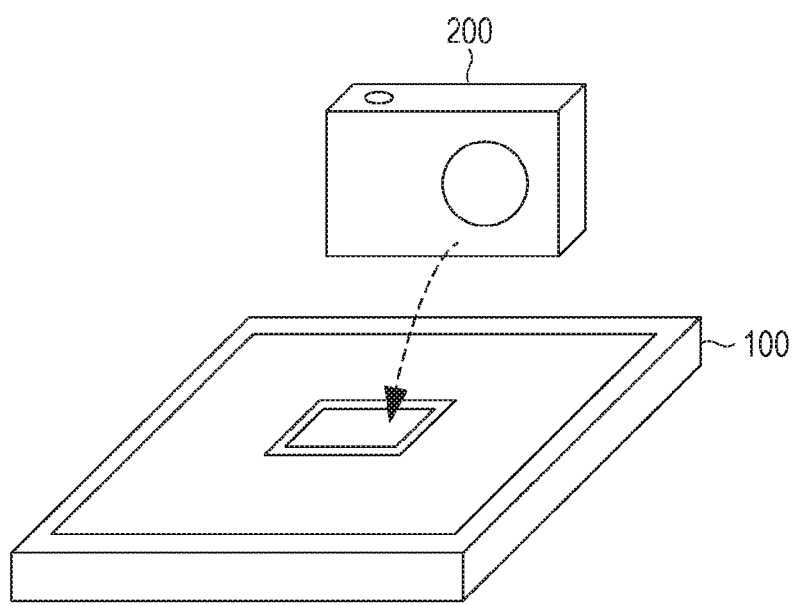
FIG. 1 illustrates an example of a system in a first embodiment.

FIG. 1 is a drawing for describing a communication system according to the present embodiment. A communication device 100 is a so-called NFC reader/writer device. An electronic appliance 200 is a mobile appliance such as a mobile phone or a digital camera. The electronic appliance 200 includes an NFC tag or a near-field wireless communication unit functioning as an NFC tag.

The communication device 100 according to the present embodiment writes the communication parameters of the wireless LAN into the electronic appliance 200 through NFC, so that the communication device 100 shares the communication parameters of the wireless LAN with the electronic appliance 200. The communication device 100 activates the function of an access point and generates the network of the wireless LAN. The network to be generated here is based on the communication parameters written in the electronic appliance 200.

As soon as the communication parameters of the wireless LAN are written by the communication device 100 through the NFC communication, the electronic appliance 200 participates in the network generated by the communication device 100. Establishing the wireless LAN connection between the communication device 100 and the electronic appliance 200 completes the handover.

After the wireless LAN connection is established, the process of a predetermined application to be executed in both the communication device 100 and the electronic appliance 200 is started. For example, the communication device 100 executes an HTTP server function, and the electronic appliance 200 accesses the communication device 100 through a browser. In this case, the electronic appliance 200 sends a list of pieces of data held therein to the communication device 100 and the user of the communication device 100 selects the piece of data that the user wants to download and receives that selected piece of data. This is an example of the service to be provided. The process after the handover is not limited to the example above.

<Configuration of Communication Device 100>

FIG. 2A is a block diagram illustrating an example of a configuration of a digital camera, which corresponds to an example of the communication device 100 according to the present embodiment. Although the digital camera is described as one example of the communication device 100 here, the communication device is not limited to the digital camera and may be a portable medium player or an information processing device such as a so-called tablet device or a personal computer.

A control unit 101 is a central processing unit (CPU) that controls each unit of the communication device 100 in accordance with programs to be described below. Instead of the control unit 101 that controls the entire device, a plurality of pieces of hardware may share the process to control the entire device.

Random access memory (RAM) 102 is a memory mainly used as a work area of the control unit 101 or a temporary buffer area for storing data.

A display output unit 103 includes HDMI®, DVI, or the like. The display output unit 103 outputs display of an operation screen or the like to a display device on the basis of an instruction from the control unit 101.

An internal bus 104 is a bus for mutually connecting process blocks in the communication device 100. Through the internal bus 104, the data are transmitted and received among the process blocks.

An operation unit 105 includes a button, a four-way operational key, a touch panel, a remote controller, or the like to accept the operation instruction from the user. The operation information input through the operation unit 105 is transmitted to the control unit 101. Based on the operation information, the control unit 101 controls the process blocks.

A recording unit 106 is a recording medium. The recording unit 106 can record data received from another device, for example. The recording unit 106 may be detachably attached to the communication device 100, or may be incorporated in the communication device 100. In other words, it is only required that the communication device 100 can access the recording medium.

A communication unit 107 is an interface used to connect to another device. In this embodiment, the communication unit 107 includes an interface used to communicate with another device through the wireless LAN in accordance with the IEEE 802.11 specification. For example, the communication can be made through the wireless LAN in accordance with the IEEE 802.11n/a/g/b/n/ac specifications.

A near-field wireless communication unit 108 includes, for example, an antenna used for the wireless communication, a modulation/demodulation circuit for processing a wireless signal, and a communication controller. The near-field wireless communication unit 108 outputs a modulated wireless signal from the antenna, and demodulates a wireless signal received with the antenna. This achieves the noncontact near-field communication in accordance with the ISO/IEC 18092 specification (so-called NFC: Near-Field Communication). The near-field wireless communication unit 108 according to this embodiment is disposed on a top plane of the communication device 100.

The communication device 100 and the electronic appliance 200 start to communicate and connect with each other by having their near-field wireless communication units close to each other. In the case of the connection with the use of the near-field wireless communication units, it is not always necessary to get the near-field wireless communication units in contact with each other. The communication is possible with a certain distance between the near-field wireless communication units. Thus, connecting the devices only needs to place the devices in the range where the near-field wireless communication is possible. In the description below, bringing the devices close enough to be capable of the near-field wireless communication is also referred to as approximating the devices.

The communication will not start if the near-field wireless communication units are out of the range where the near-field wireless communication is possible. The near-field wireless communication remains connected while the devices have their near-field wireless communication units within the near-field wireless communication possible range; however, once their near-field wireless communication units are separated from each other out of that range, the communication is disconnected. The noncontact near-field communication achieved by the near-field wireless communication unit 108 is not limited to NFC but may be other wireless communication. For example, the noncontact near-field communication achieved by the near-field wireless communication unit 108 may be the noncontact near-field communication in accordance with the ISO/IEC 14443 specification.

In this embodiment, the communication speed of the communication unit 107 is higher than that of the near-field wireless communication unit 108 to be described below. The communication of the communication unit 107 covers a wider range than the communication of the near-field wireless communication unit 108. Instead, the near-field wireless communication unit 108 can limit the communication partner due to the narrow communicable range. This eliminates the necessity of exchanging the encryption key, which is required in the communication of the communication unit 107. In other words, the near-field wireless communication unit 108 enables the easier communication than the communication unit 107.

The communication unit 107 of the communication device 100 according to the present embodiment has an AP mode and a CL mode. The AP mode enables the unit to operate as an access point in the infrastructure mode. The CL mode enables the unit to operate as a client in the infrastructure mode. Operating the communication unit 107 in the CL mode enables the communication device 100 in the present embodiment to operate as a client device in the infrastructure mode. If the communication device 100 operates as the client device, the communication device 100 can participate in the network of a peripheral AP device by being connected to the AP device. If the communication unit 107 operates in the AP mode, the communication device 100 according to the present embodiment can operate as a simplified AP with the function of the AP more limited (this AP is hereinafter referred to as simple AP). The communication device 100 operating as the simple AP can form the network by itself. The peripheral devices near the communication device 100 recognize the communication device 100 as an AP device and can participate in the network formed by the communication device 100. The programs for operating the communication device 100 as above are held in the internal memory of the control unit 101.

The communication device 100 according to the present embodiment is one kind of APs but is the simplified AP (simple AP) not having a gateway function of transferring the data received from the CL device to the Internet provider. Therefore, the communication device 100 cannot transfer the data received from other devices in the network formed by the communication device 100 to another network such as the Internet.

<Configuration of Electronic Appliance 200>

FIG. 2A is a block diagram illustrating a configuration of a mobile phone, which corresponds to an example of the electronic appliance 200. Although the mobile phone is described as one example of the electronic appliance 200 here, the electronic appliance 200 is not limited thereto. The electronic appliance 200 may be, for example, a digital camera, a tablet device, or a personal computer having a wireless function.

A control unit 201 controls each unit of the electronic appliance 200 in accordance with an input signal or a program, which will be described below. Instead of the control unit 201 that controls the entire device, a plurality of pieces of hardware may share the process to control the entire device.

RAM 202 is a memory mainly used as a work area of the control unit 201 or a temporary buffer area for storing data. Programs such as the operation system (OS) or the applications are developed on the RAM 202 and executed by the control unit 201.

An imaging unit 203 includes an optical lens, a CMOS sensor, a digital image processing unit, etc. The imaging unit 203 converts an analog signal input through the optical lens into digital data and thus acquires a captured image. The captured image acquired by the imaging unit 203 is temporarily stored in the RAM 202 and processed based on the control of the control unit 201. For example, the process includes recording the image into the recording unit 206 and transmitting the image to another device by a communication unit 207. The imaging unit 203 further includes a lens control unit, which controls to adjust the zoom, focus, diaphragm, and the like on the basis of the instruction from the control unit 201.

A display unit 204 includes a liquid crystal panel, an organic EL panel, or the like. Based on the instruction from the control unit 201, the display unit 204 displays an operation screen, the captured image, or the like.

An operation unit 205 includes a button, a four-way operational key, a touch panel, a remote controller, or the like to accept the operation instruction from the user. The operation information input through the operation unit 205 is transmitted to the control unit 201. Based on the operation information, the control unit 201 controls the units.

A recording unit 206 is a recording medium. The recording unit 206 can record the data received from another device, for example. The recording unit 206 may be detachably attached to the electronic appliance 200 or incorporated in the electronic appliance 200. In other words, it is only required that the electronic appliance 200 can access the recording unit 206.

A communication unit 207 is an interface used to connect to another device. In this embodiment, the communication unit 207 includes an interface used to communicate with another device through the wireless LAN in accordance with the IEEE 802.11 specification. For example, the communication can be made through the wireless LAN in accordance with the IEEE 802.11n/a/g/b/n/ac specifications.

A near-field wireless communication unit 208 includes, for example, a CPU 208a that can execute a control process independently of the control unit 201, a memory 208b that accumulates data, and an antenna. The near-field wireless communication unit 208 outputs a modulated wireless signal from the antenna, and demodulates a wireless signal received with the antenna. This achieves the noncontact near-field communication in accordance with the ISO/IEC 18092 specification (so-called NFC: Near-Field Communication). The near-field wireless communication unit 208 according to this embodiment is disposed on a bottom plane of the electronic appliance 200.

The memory 208b in the near-field wireless communication unit 208 is accessible from the communication device 100 through the NFC communication, or from the CPU 208a or the control unit 201. The CPU 208a includes ROM for storing the programs and RAM for the programs, though not illustrated.

The near-field wireless communication unit 208 according to this embodiment has a function of communicating with the NFC target in the mode including the card emulation mode. In the case of the peer-to-peer mode or the card emulation mode, the near-field wireless communication unit 208 receives the modulated RF signal from the antenna and saves the signal in the RAM 202. The near-field wireless communication unit 208 applies load modulation on the received RF signal and transmits the response signal. In the description below, the difference in operation between the modes is not taken into consideration, and the near-field wireless communication unit 208 is also referred to as a tag or an NFC tag simply.

The CPU 208a can operate on the power supplied from the communication device 100, and can notify the control unit 201 of an interruption signal upon the activation of a power management unit 209. The interruption to the control unit 201 can be issued for each read access or write access for the memory 208b. In addition, the CPU 208a can determine whether the interruption is the writing in the memory 208b or the reading from the memory 208b. The CPU 208a can determine which address in the memory 208b the access has been intended to. The CPU 208a can acquire the information about the status of the electronic appliance 200 from the control unit 201 in advance and save the information in the memory 208b. The CPU 208a can acquire the information about a battery 210.

The power management unit 209 supplies power to each unit of the electronic appliance 200 by controlling the battery 210 upon the reception of the signal from the near-field wireless communication unit 208 or the power button, which is not illustrated.

The battery 210 supplies the power to each unit in the electronic appliance 200 by the instruction from the power management unit 209.

An internal bus 211 is a bus for mutually connecting the process blocks in the electronic appliance 200.

<System Operation>

Figure 3:
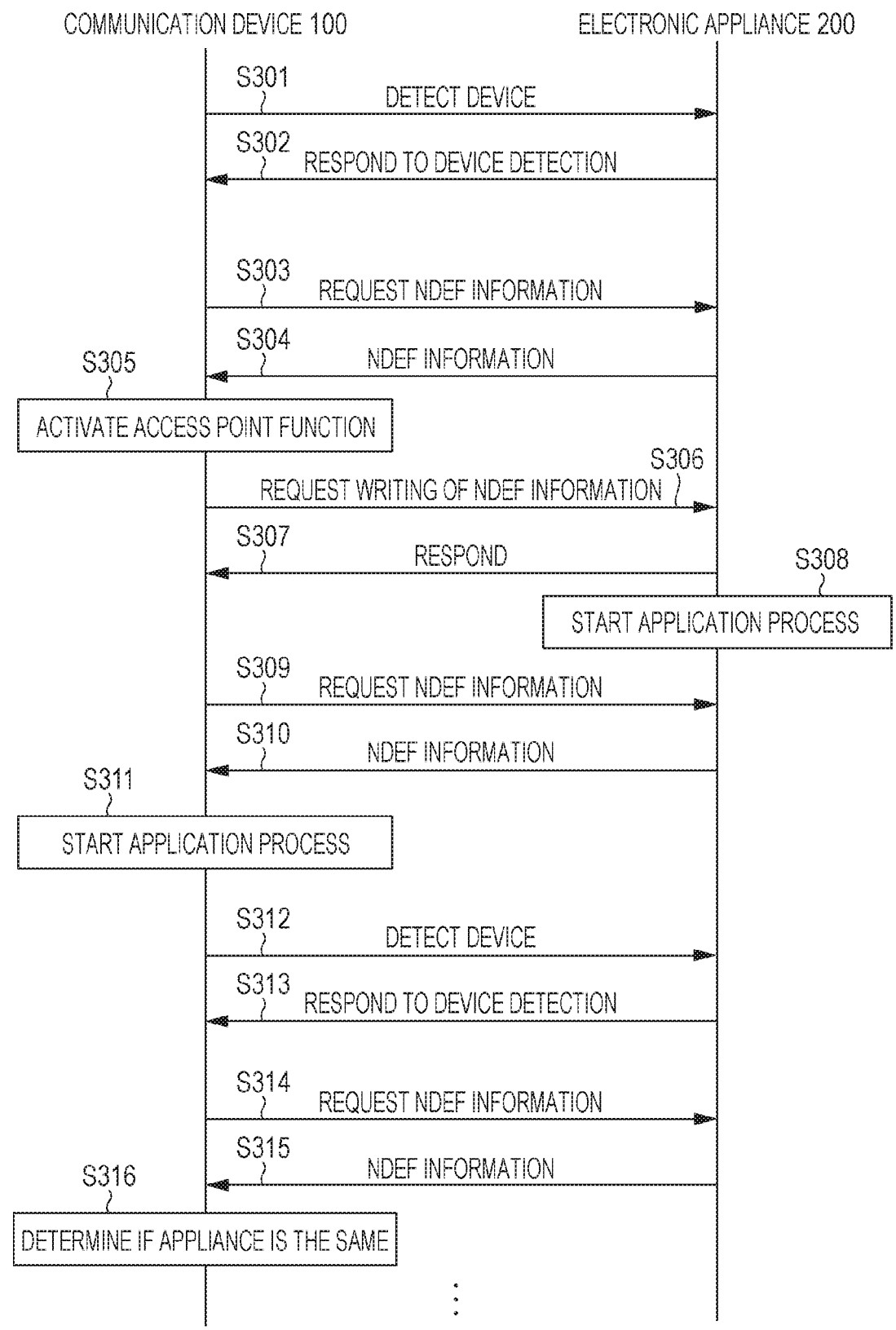
FIG. 3 is a sequence diagram illustrating the operation of the system in the first embodiment.

FIG. 3 is a sequence diagram for describing the summary of the procedure for the handover between the communication device 100 and the electronic appliance 200 according to this embodiment.

In S301, the communication device 100 constantly emits a signal for detecting the proximity of a tag.

If the electronic appliance 200 has come close to the communication device 100, the near-field wireless communication unit 208 of the electronic appliance 200 returns a response to the signal from the communication device 100 (S302). By receiving this response, the communication device 100 can recognize the electronic appliance 200.

Figure 4:
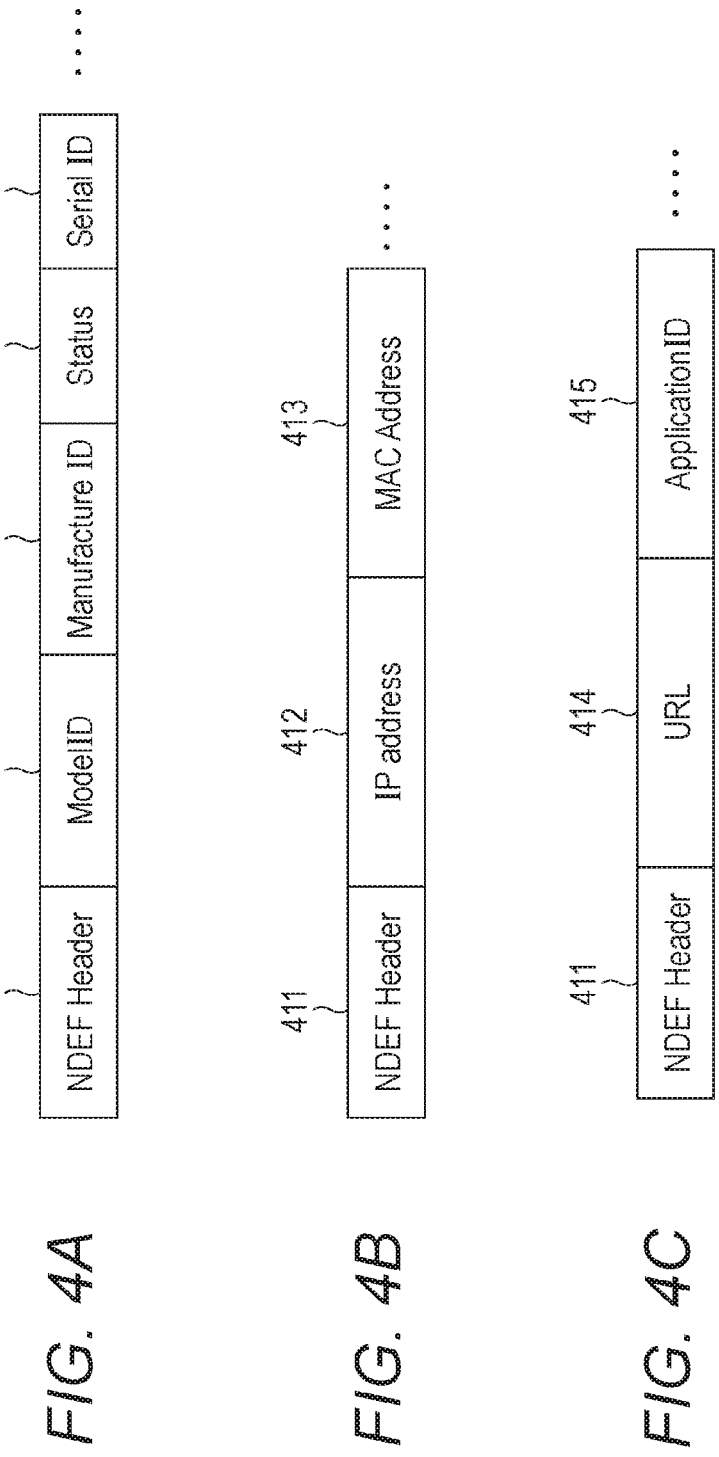
FIGS. 4A to 4C illustrate examples of a data configuration in the first embodiment.

Subsequently, in response to the detection, the communication device 100 has a read access to the electronic appliance 200 (S303). Specifically, the communication device 100 transmits a command of making a read request to the electronic appliance 200, thereby requesting the electronic appliance 200 to transmit data. In response to the read access, the electronic appliance 200 returns the data recorded in the memory 208b (S304). Thus, the data recorded in the memory 208b of the near-field wireless communication unit 208 of the electronic appliance 200 are read out. FIG. 4A is a conceptual diagram illustrating the data that are read out here. The data in FIG. 4A are configured in NDEF (NFC Data Exchange Format). The data include the information of a header 401 representing the NDEF, and also include various pieces of identification information. In this embodiment, the identification information includes a Model ID 402 for identifying the device, a Manufacture ID 403 for identifying the manufacturer, a Serial ID 405 for identifying the individual device, and a Status 404 representing the status information of the electronic appliance 200. The Status 404 corresponds to a value representing the status of the electronic appliance 200, and "OK" is stored therein if the predetermined application to be executed in accordance with the NFC communication is executable, and "NG" is stored therein if the application is not executable. For example, "OK" is stored if the residual battery is enough and "NG" is stored if the residual battery is not enough. If the data written from another device have been successfully read out and understood by the control unit 201, this result is transmitted to the other device by using this Status 404. In this case, "Complete" is stored in the Status 404. The use of this information will be described below.

Now, the description is FIG. 3 is restarted.

Subsequently, the communication device 100 having acquired the data activates the access point function in S305 and generates the network. In addition, the communication device 100 has a write access to the electronic appliance 200 in S306. Specifically, the communication device 100 writes the communication parameters of the network generated in S305 in the memory 208b of the electronic appliance 200. FIG. 4B is a conceptual diagram of the data written here. The data in FIG. 4B are configured in the NDEF. The data include the information of a header 411 representing the NDEF, an IP Address 412 and a MAC Address 413 used in the connection in the wireless LAN communication or the like, SSID, and other communication parameters. As illustrated in FIG. 4C, in addition to the information of the header 411 representing the NDEF format, a URL 414 representing the server address of the communication device 100 or an Application ID 415 representing the kind of the application to activate may be included.

Now, the description is FIG. 3 is continued.

In response to the write access from the communication device 100, the near-field wireless communication unit 208 of the electronic appliance 200 returns a response to notify the writing has been accepted normally (S307). In addition, the application process is started in S308. In this embodiment, the application process includes the activation of the wireless LAN, the participation in the network generated by the communication device 100 in S305, the connection to the communication device 100 through the application, and the access to the HTTP server. The participation to the network generated by the communication device 100 in S305 employs the communication parameters written by the communication device 100 in S306. The application process as above is executed in parallel to the communication process in the NFC system, which will be described below.

On the other hand, in S309, the communication device 100 has another read access to the electronic appliance 200. In response to this, the electronic appliance 200 returns the information representing that the preparation for the application process is already done (S310). The communication device 100 having received this information starts the application process (S311). The application process in the communication device 100 includes the process for realizing the service such as the connection to the communication device 100 through the application and the exchange of the data after the connection.

Even after the completion of the handover as above, the near-field wireless communication unit 108 of the communication device 100 repeats the device detection and the read access (S312 to S315). This is because the handover with another electronic appliance is concerned. Note that the communication device 100 executes the handover with another electronic appliance while maintaining the communication with the electronic appliance 200 currently executing the application process. Another concern is an attempt of another near-field wireless communication with the appliance for which the handover has already been carried out (here, the electronic appliance 200). In this case, the handover is not necessary to be repeated but the NFC possibly triggers another handover process.

In view of this, the communication device 100 according to this embodiment compares the information obtained by the read access in S312 with the information obtained by the read access in S303, and determines whether the approximating appliance is the same appliance, i.e., the state where the device 100 is close to the same appliance has continued. For example, the identification information including the Model ID and the Serial ID in FIG. 4A is compared and if these pieces of information coincide, the appliance can be determined as the same one.

If the communication device 100 according to this embodiment has determined the appliance is the same appliance, the process for the handover is not carried out and repeats the device detection and the read access. Thus, the process to be executed in response to the near-field wireless communication can be controlled as appropriate.

The processes from S301 to S304 are executed repeatedly, which is similar to the processes from S312 to S315. For simplifying the description, FIG. 3 does not illustrate the step of determining the same appliance (S316) after S304 but in fact, the determination for the same appliance is also performed after S304.

<Process Flow of Polling of Communication Device 100>

Next, the operation of the communication device 100 for achieving the procedure of FIG. 3 is described.

Figure 5:
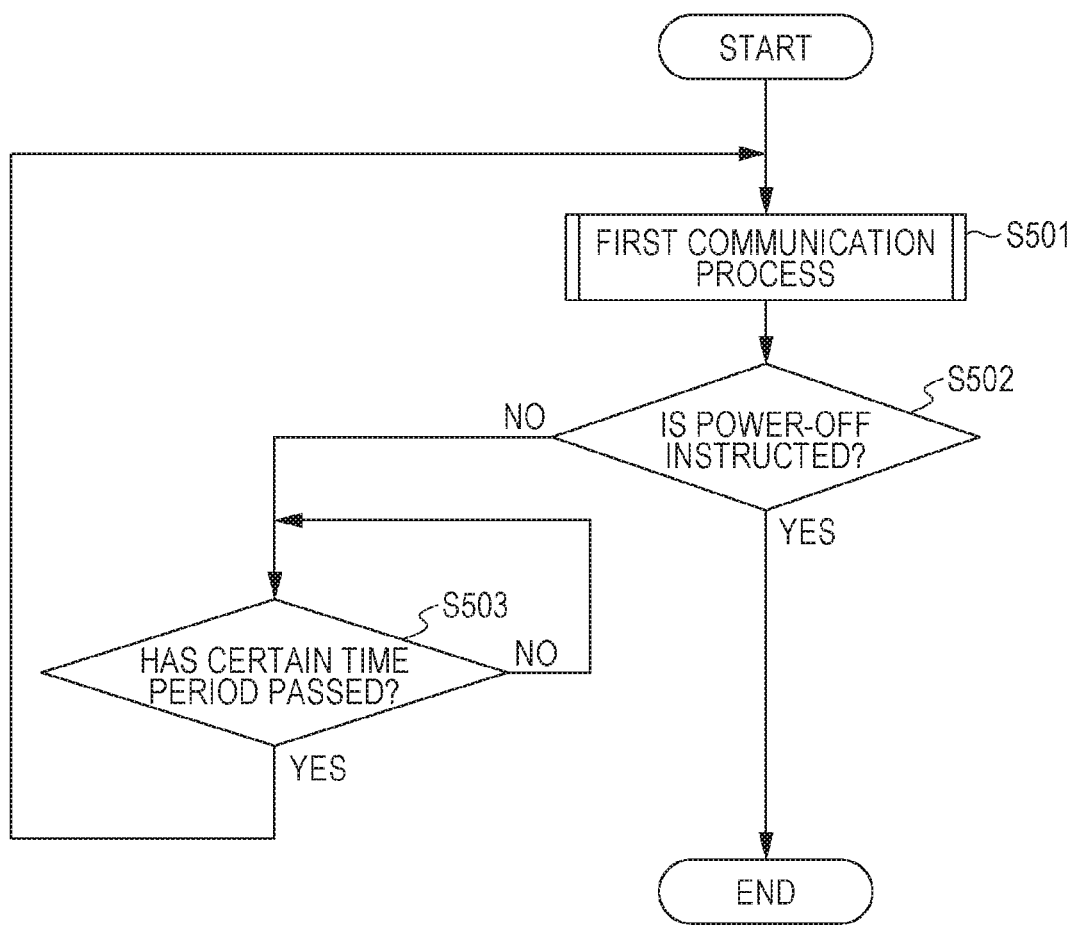
FIG. 5 is a flowchart illustrating the operation of the communication device in the first embodiment.

FIG. 5 is a flowchart illustrating the operation for the communication device 100 to execute the polling process. The control program in this flowchart is the program stored in the recording unit 106. When the power is input to the communication device 100, the program is developed in the RAM 102 from the recording unit 106 and executed by the control unit 101.

In S501, the control unit 101 controls the near-field wireless communication unit 108 to detect the appliance, and performs the predetermined application process (for example, execution of HTTP server function). The process of S501 will be specifically described below with reference to FIG. 6. After the process of S501, the process advances to S502.

In S502, the control unit 101 determines whether the instruction for turning off the power has been accepted from the user through the operation unit 105. If it is determined that the instruction for turning off the power has been accepted (Yes in S502), the flowchart ends. If, on the other hand, it is determined that such an instruction has not been accepted (No in S502), the process advances to S503.

In S503, the control unit 101 determines whether a predetermined period of time has passed. If it is determined that the predetermined period of time has passed (Yes in S503), the process returns to S501 and repeats S501 to S503. If it is determined that the predetermined period of time has not passed (No in S503), the process of S503 is repeated. The control unit 101 may change the predetermined period of time in S503 at random.

The polling process of the communication device 100 has been described.

<Read/Write Process Flow of Communication Device 100>

Subsequently, description is made of the process of S501 in FIG. 5.

Figure 6:
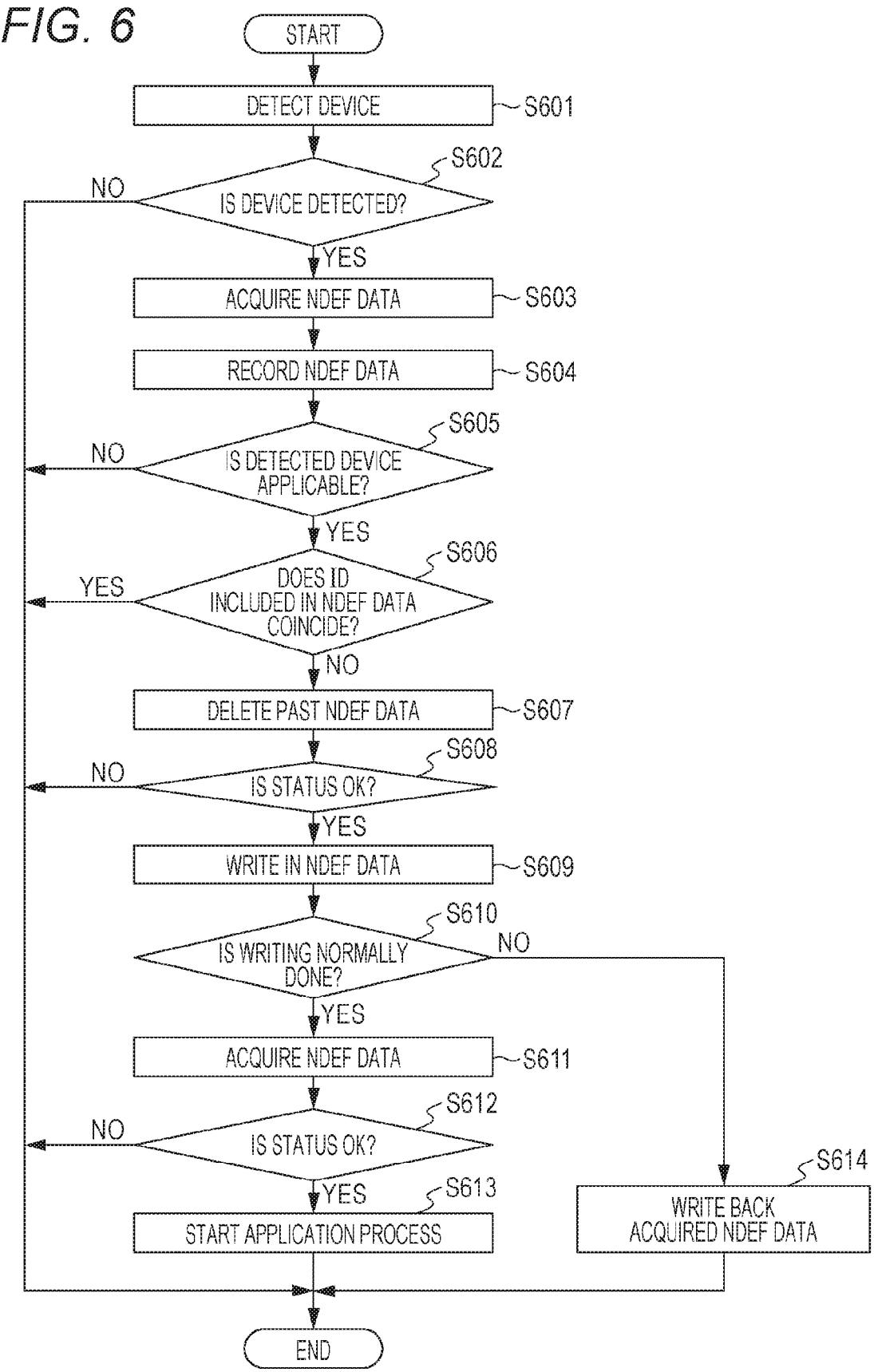
FIG. 6 is a flowchart illustrating the operation of the communication device in the first embodiment.

FIG. 6 illustrates the process of S501 in FIG. 5, which is executed upon the start of the process in FIG. 5.

In S601, the control unit 101 controls the near-field wireless communication unit 108 to emit a detection signal, which detects an NFC-enabled appliance, and checks if there is any NFC-enabled appliance in the communicable range. Specifically, the control unit 101 transmits the SENS_REQ command, the SENSB_REQ command, the SENSF_REQ command, and the like defined by the NFC communication protocols. Receiving the response to any of these commands means that there is the NFC-enabled appliance in the communicable range. The process in this step corresponds to S301 in FIG. 3.

In S602, the control unit 101 determines whether the response to the command transmitted in S601 has been received. Specifically, the control unit 101 determines whether the response to any of the SENS_RES command, the SENSB_RES command, and the SENSF_RES command has been received. If it is determined that the response has been received (Yes in S602), the presence of the NFC-enabled appliance is confirmed and then, the process advances to S603. On the other hand, if it is determined that the response has not been received (No in S602), i.e., that the NFC-enabled appliance does not exist, this flowchart ends and the process returns to FIG. 5. The response received in this step corresponds to the response transmitted from the electronic appliance 200 in S302 in FIG. 3. Here, the process may return to FIG. 5 after the NDEF data stored in the past are deleted.

In S603, the control unit 101 has a read access to the detected NFC-enabled appliance. The process of this step corresponds to S303 and S304 in FIG. 3. Thus, the NDEF data described in FIG. 4A are acquired.

Subsequently, in S604, the control unit 101 records the acquired NDEF data in the RAM 102. Here, the process is repeated in the order of S501 to S503 in FIG. 5. If the data read out in S603 in the past are held, the data read out in this step are recorded while at least the latest piece of the past data is maintained.

Next, in S605, based on the NDEF data saved in the RAM 102, the control unit 101 determines whether the appliance detected in S603 can perform the predetermined application process. That is to say, the control unit 101 determines whether the appliance can execute the predetermined application process that can be handled by both the device and the appliance. Here, the control unit 101 determines this by determining whether the data of the Model ID 402, the Manufacture ID 403, and the Serial ID 405 are the predetermined data. If it is determined that the appliance can execute the predetermined application process (Yes in S605), the process advances to S606. On the other hand, if it is determined that the appliance cannot execute the predetermined application process (No in S605), the flowchart ends here and the process returns to FIG. 5.

In S606, the control unit 101 determines whether each ID read out of the memory 208b of the electronic appliance 200 in S603 coincides with each ID read out in S603 previously and saved in the RAM 102. If the IDs coincide, the control unit 101 determines that the electronic appliance 200 remains close and ends the flowchart without having the write access to be described below. This can prevent the electronic appliance 200 from executing the unnecessary application process, like executing the unnecessary application process in response to the write access or ignoring the event of the write access because of executing the application process. On the other hand, if the IDs do not coincide, the process advances to S607. Note that S606 may come before S605.

In S607, the control unit 101 deletes the NDEF data read out previously in S603, so that the RAM 102 holds only the NDEF data read out in S603 this time.

In S608, the control unit 101 checks the state of the electronic appliance 200 on the basis of the value in the Status 404 in the acquired NDEF data. If it is determined that the value of Status 404 is "OK", the control unit 101 determines that the electronic appliance 200 is in the state that the appliance 200 can execute the predetermined application process (Yes in S608) and the process advances to S609. If it is determined that the value of Status 404 is "NG", the control unit 101 determines that the electronic appliance 200 is not in the state that the appliance 200 can execute the predetermined application process (No in S608) and this flowchart ends.

In S609, the control unit 101 has a write access to the electronic appliance 200 by controlling the near-field wireless communication unit 108. For example, the control unit 101 writes the NDEF data, which are illustrated in FIG. 4B, in the electronic appliance 200. The process in this step corresponds to the process in S306 in FIG. 3. In this embodiment, the data to be written here include the communication parameters necessary for the connection to the wireless LAN, such as the SSID, the password, and the IP address. Prior to the execution of this step, the wireless LAN access point function is activated, and the beacon including the communication parameters to be transmitted in this step starts to be transmitted. Thus, the network is generated.

In S610, by controlling the near-field wireless communication unit 108, the control unit 101 determines whether the writing has been finished normally. By receiving the response through the NFC from the electronic appliance 200, the control unit 101 can know that the writing has been finished normally. The response to be received here corresponds to the response of S307 in FIG. 3. If the control unit 101 has determined that the writing finished normally (Yes in S610), the process advances to S611. If the control unit 101 has determined that the writing did not finish normally (No in S610), the process advances to S614.

In S611, the control unit 101 has a read access to the electronic appliance 200 to acquire the NDEF data in order to know the status of the electronic appliance 200, which is similar to S603. The process in this step corresponds to the process in S309 and S310 in FIG. 3.

In S612, based on the value in the Status 404 in the acquired NDEF data, the control unit 101 checks the state of the electronic appliance 200. If the value in the Status 404 is "Complete", the control unit 101 determines that the control unit 201 of the electronic appliance 200 has already read out the data received through the NFC from the memory 208b and has transited to the application process (Yes in S612). In this case, the process advances to S613. On the other hand, if the value in the Status 404 is "NG", it is determined that the electronic appliance 200 is not ready for the application process (No in S612), and the flowchart ends here and the process returns to FIG. 5. After the electronic appliance 200 receives the data upon the write access, the CPU 208a writes the value of "Complete" in the memory 208b in addition to starting the application process.

In S613, the control unit 101 starts the application process. For example, the control unit 101 executes the HTTP server function and waits for the access from the electronic appliance 200. The application process in S613 may be other process than the above. After starting the application process, the control unit 101 ends the flowchart and returns the process to FIG. 5.

In S614, by controlling the near-field wireless communication unit 108, the control unit 101 writes the NDEF data acquired in S603 from the RAM 102 back to the electronic appliance 200, thereby restoring the original value. After that, this flowchart ends and the process returns to FIG. 5.

<Process Flow of Electronic Appliance 200>

Next, description is made of the operation of the electronic appliance 200 for achieving the procedure of FIG. 3.

Figure 7:
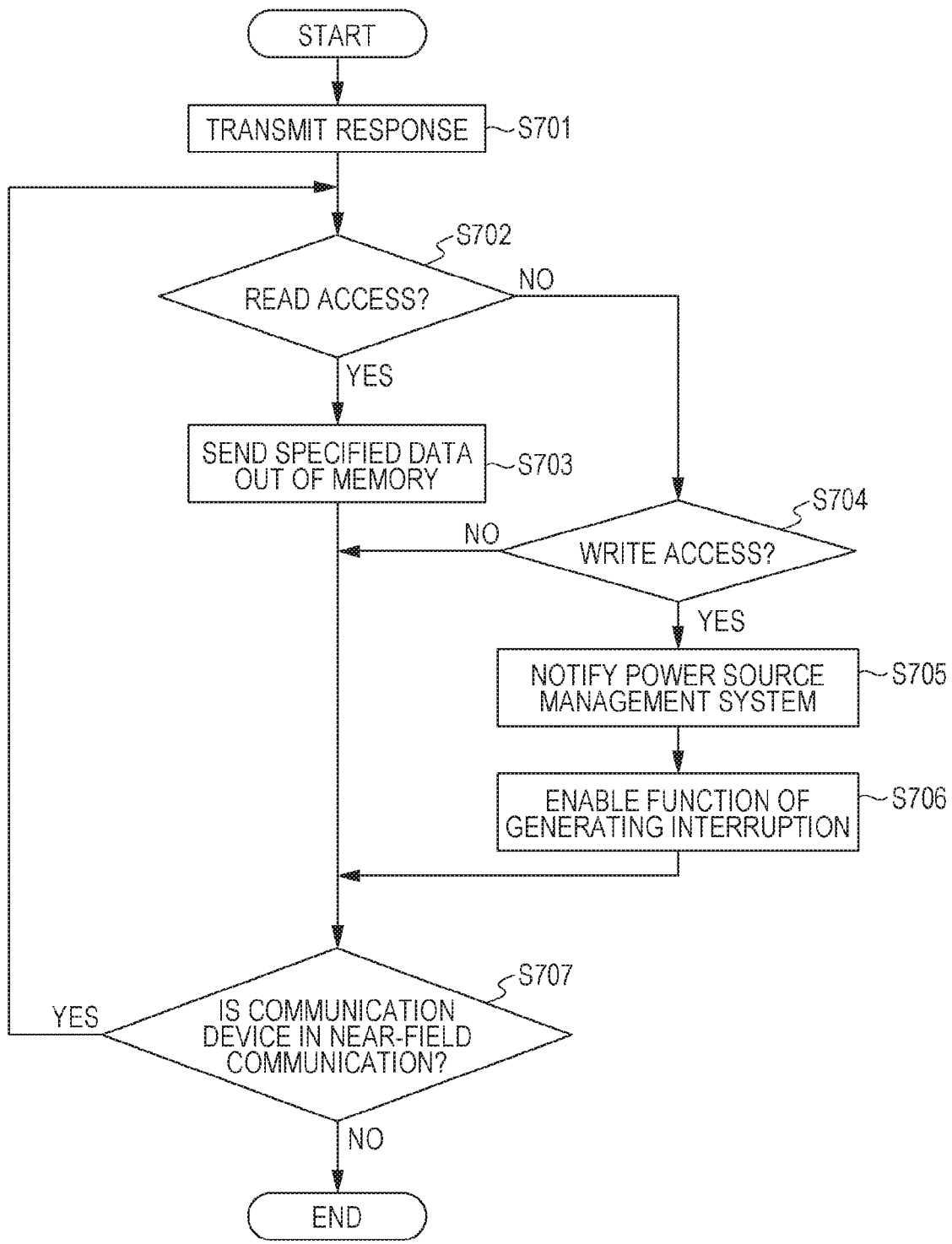
FIG. 7 is a flowchart illustrating the operation of an electronic appliance in the first embodiment.

FIG. 7 is a flowchart illustrating the operation of the electronic appliance 200 in this embodiment. The control program for achieving this flowchart is stored in the ROM inside the CPU 208a, and this program is developed in the RAM inside the CPU 208a and executed by the CPU 208a. This flowchart is started in response to the power supply to the near-field wireless communication unit 208 generated by the reception of the signal including the command for detecting the device in S601 in FIG. 6. Before the event is notified to the power management system in this flowchart, the near-field wireless communication unit 208 operates on the power generated by the reception of the signal for detecting the device in S601 in FIG. 6.

This program may be executed by the control unit 201.

First, in S701, the CPU 208a of the near-field wireless communication unit 208 returns the response such as the SENS_RES, the SENSE_RES, or the SENSF_RES for the command such as the SENS_REQ, the SENSE_REQ, or the SENSF_REQ received from the communication device 100. The process in this step corresponds to the process in S302 in FIG. 3.

Next, in S702, the CPU 208a determines whether the communication device 100 has had a read access to the memory 208b. If the CPU 208a has determined that the communication device 100 had a read access to the memory 208b (Yes in S702), the process advances to S703. If the CPU 208a has determined that the communication device 100 did not have a read access to the memory 208b (No in S702), the process advances to S704.

In S703, the CPU 208a returns the data of the memory 208b in accordance with the address information specified by the read access from the communication device 100. For example, the CPU 208a returns the NDEF data illustrated in FIG. 4A. The CPU 208a has acquired the state of the electronic appliance 200 in advance from the control unit 201 and maintained the state as the Status 404 of the NDEF data. The process in this step corresponds to the process in S304 in FIG. 3.

In S704, the CPU 208a determines whether the communication device 100 has had a write access to the memory 208b. If the CPU 208a has determined that the communication device 100 had a write access to the memory 208b (Yes in S704), the process advances to S705. If the CPU 208a has determined that the communication device 100 did not have a write access to the memory 208b (No in S704), the process advances to S707.

In S705, the CPU 208a issues to the power management unit 209, a signal for supplying power to the units of the electronic appliance 200 (the signal corresponds to event notification). Upon the reception of the signal from the near-field wireless communication unit 208, the power management unit 209 supplies power to the units of the electronic appliance 200.

In S706, the CPU 208a issues the interruption by enabling the function of an interruption signal. The interruption signal is issued from the near-field wireless communication unit 208 to the control unit 201 upon the write access to the memory 208b.

In S707, the CPU 208a determines whether the communication device 100 is in the middle of near-field communication. If the CPU 208a has determined that the device 100 is in the middle of near-field communication (Yes in S707), the process returns to S702. If the CPU 208a has determined that the device 100 is not in the middle of near-field communication (No in S707), this flowchart ends.

Subsequently, description is made of the operation of the control unit 201 to which the power is supplied in S705 in FIG. 7.

Figure 8:
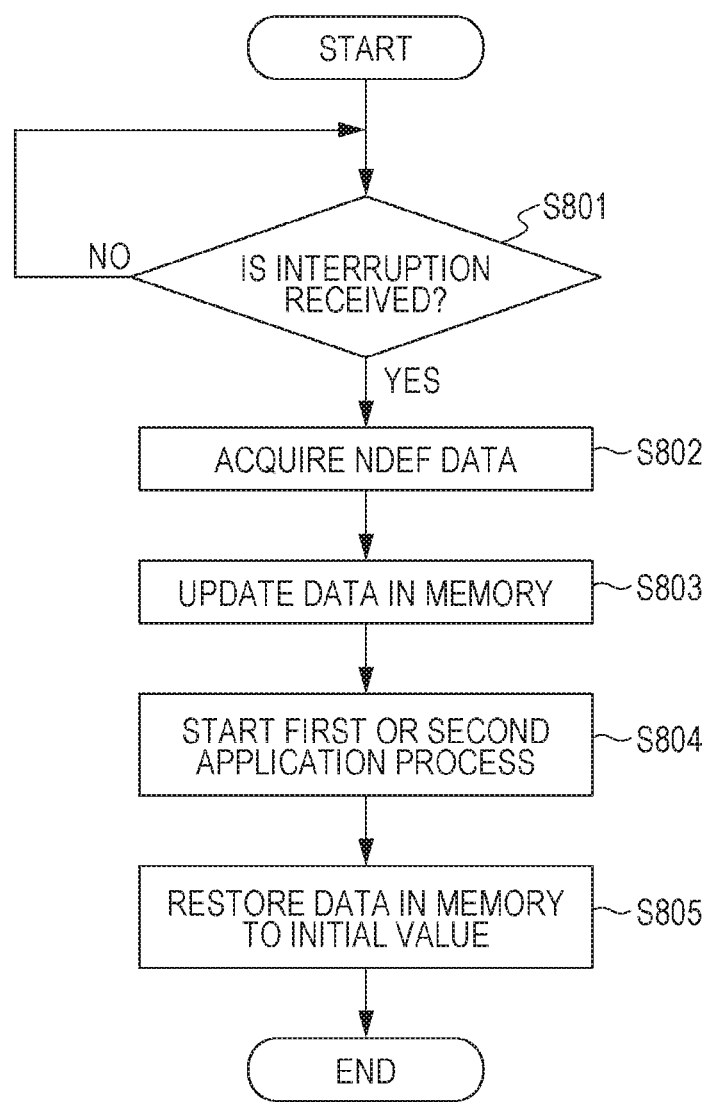
FIG. 8 is a flowchart illustrating the operation of the electronic appliance in the first embodiment.

FIG. 8 illustrates one example of the process performed by the control unit 201 of the electronic appliance 200 in this embodiment. The operation of this flowchart proceeds when the control program stored in the recording unit 206 is developed in the RAM 202 and executed by the control unit 201. This program may alternatively be executed by the CPU 208a.

In S801, the control unit 201 determines the presence or absence of the interruption signal from the near-field wireless communication unit 208. This interruption signal is the signal transmitted from the near-field wireless communication unit 208 in S706. If the control unit 201 has determined that the interruption signal was received from the near-field wireless communication unit 208 (Yes in S801), the process advances to S802. On the other hand, if the control unit 201 has determined that the interruption signal was not received from the near-field wireless communication unit 208 (No in S801), the process of S801 is repeated until the interruption signal is received. Note that the control unit 201 may be activated upon the reception of the interruption signal from the near-field wireless communication unit 208.

In S802, the control unit 201 analyzes the values written in the memory 208b and determines whether the values are the NDEF data illustrated in FIG. 4B. Based on this result, the control unit 201 determines whether the access is from the control device 100. If it is determined that the access is from the communication device 100, the control unit 201 acquires the IP Address 412 and the MAC Address 413 of the communication device 100 from the NDEF data recorded in the memory 208b, and saves the data in the RAM 202.

Next, in S803, the control unit 201 updates the data in the memory to be the NDEF data illustrated in FIG. 4B in order to notify the communication device 100 of the fact that the information written upon the write request to the memory 208b has been successfully read out. Moreover, the control unit 201 changes the Status 404 to be "Complete".

In S804, the control unit 201 starts the application process. For example, the control unit 201 participates in the network generated by the communication device 100 on the basis of the data received in S802 and accesses the communication device 100 that executes the HTTP server function.

In S805, the control unit 201 writes the data in the memory 208b to notify that the application process has finished. The data to be written are the NDEF data illustrated in FIG. 4A, and the control unit 201 changes the Status 404 to be "OK", which is the initial value.

In this embodiment, the control unit 201 is activated upon the write access, not the read access. This enables the communication device 100 to know the ID without activating the electronic appliance 200.

The communication device 100 according to this embodiment does not have the write access to the appliances that have remained close to the device 100. This can suppress the unnecessary communication.

Second Embodiment

A second embodiment is hereinafter described with reference to the drawing. In the first embodiment, the electronic appliance 200 is turned on whenever the write access is made.

The electronic appliance 200 according to this embodiment selects, on the other hand, whether to supply power to the units in the electronic appliance 200 is selected in consideration of a predetermined condition even upon the write access. The second embodiment is similar to the first embodiment in some points for which the description is omitted, and the portion unique to the second embodiment is mainly described. The process of the communication device 100 is similar to the process illustrated in FIG. 5 and FIG. 6, and the process of the control unit 201 of the electronic appliance 200 is similar to the process illustrated in FIG. 8.

Figure 9:
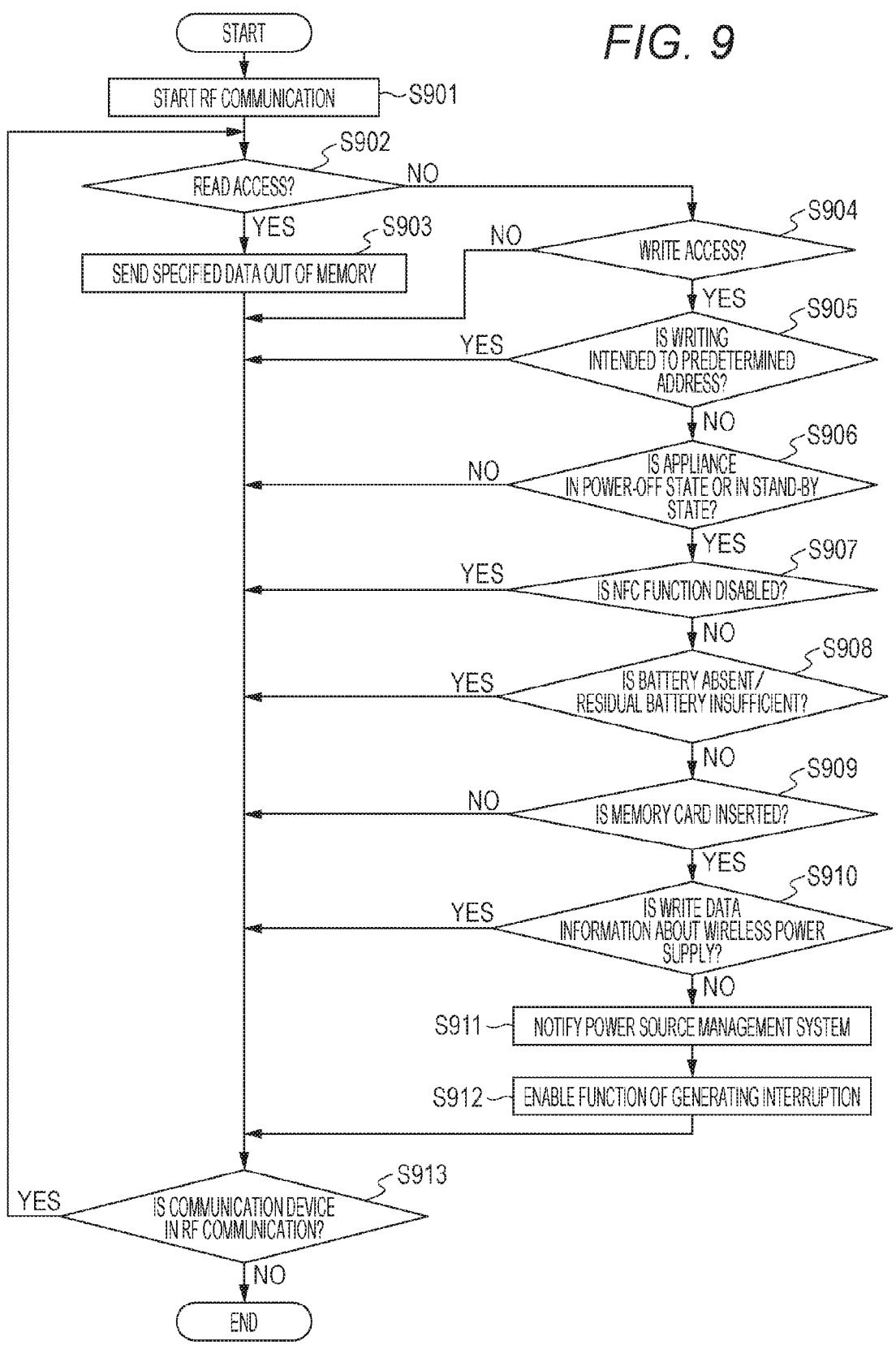
FIG. 9 is a flowchart illustrating the operation of an electronic appliance in a second embodiment.

FIG. 9 illustrates an example of the process of the near-field wireless communication unit 208 of the electronic appliance 200 in this embodiment.

In S901 to S904, the process is similar to S701 to S704 in FIG. 7.

If it is determined that the communication device 100 has had a write access to the memory 208b in S904, the process advances to S905.

In S905, the CPU 208a determines whether the address of the memory 208b to which the writing has been instructed by the write access accepted from the communication device 100 is the predetermined address. If the CPU 208a has determined that the address is the predetermined address (Yes in S905), the process advances to S913. If the CPU 208a has determined that the address is not the predetermined address (No in S905), the process advances to S906.

In S906, the CPU 208a determines whether the power is supplied from the battery 210 to each unit of the electronic appliance 200 on the basis of the information from the power management unit 209. In addition, based on the status information from the control unit 201, the CPU 208a determines whether the control unit 201 is in the sleep state with the power supplied to some process units. If it is determined that the electronic appliance 200 is in the power-off state or in the sleep state (Yes in S906), the process advances to S907. If it is determined that the electronic appliance 200 is in the power-on state and not in the sleep state (No in S906), the process advances to S913.

In S907, the CPU 208a checks the enable/disable setting information of the NFC function acquired from the control unit 201 and saved in the memory 208b. If it is determined that the NFC function is disabled from the enable/disable setting information of the NFC function (Yes in S907), the process advances to S913. If it is determined that the NFC function is enabled from the enable/disable setting information of the NFC function (No in S907), the process advances to S908.

In S908, the CPU 208a checks if the battery 210 is inserted and acquires the residual battery information. If the CPU 208a has determined the battery is absent or the residual battery is insufficient (Yes in S908), the process advances to S913. If the CPU 208a has determined the battery is inserted or the residual battery is sufficient (No in S908), the process advances to S909.

In S909, the CPU 208a checks the presence or absence of the recording unit 206. The presence or absence of the recording unit 206 can be checked by referring to the information representing the presence or absence of the recording unit 206, which is acquired from the control unit 201 in advance and recorded in the memory 208b. This is in order to avoid the failure of the application process in the absence of the recording medium. If the recording medium is inserted (Yes in S909), the process advances to S910. If the recording medium is not inserted (No in S909), the process advances to S913.

In S910, the CPU 208a determines whether the NDEF data written in the memory 208b by the communication device 100 are the data about the wireless power transmission. If the data are about the wireless power transmission, the CPU 208a determines it is better not to turn on the electronic appliance 200 because charging the battery is intended. In this case (Yes in S910), the process advances to S913. If the written NDEF data are not about the wireless power transmission (No in S910), the process advances to S911.

In S911, the CPU 208a issues to the power management unit 209, the signal for supplying power to the units of the electronic appliance 200. Upon the reception of the signal from the near-field wireless communication unit 208, the power management unit 209 supplies the power to the units of the electronic appliance 200.

In S912 and S913, the process is similar to S706 and S707 in FIG. 7.

The power is supplied to the units of the electronic appliance 200 depending on the determination made in S905 to S910. This can start the power supply under the more appropriate circumstances.

Third Embodiment

A third embodiment is hereinafter described with reference to the drawing.

In the above embodiment, in the case where the electronic appliance 200 and the communication device 100 remain close to each other, the communication device 100 determines whether the appliance 200 is the same appliance by having a read access to the appliance. The electronic appliance 200 uses the common bus both in the process for responding to the access from the communication device 100 and in the process for responding to the access from the control unit 201. Therefore, it is necessary to exclude the access in order to prevent the conflict. In this case, the access from the control unit 201 to the memory 208b cannot be accepted during the read access from the communication device 100, for example, so that the process cannot be performed smoothly. In view of this, in this embodiment, the communication device 100 determines whether the appliance is the same appliance without having the read access in order to achieve the smooth process. This makes the access from the communication device 100 less frequent and suppresses the exclusion of the access from the control unit 201. Some parts of this embodiment are common to the first and second embodiments; therefore, the description will mainly be made of the portion unique to the third embodiment.

<Read/Write Process Flow of Communication Device 100>

Figure 10:
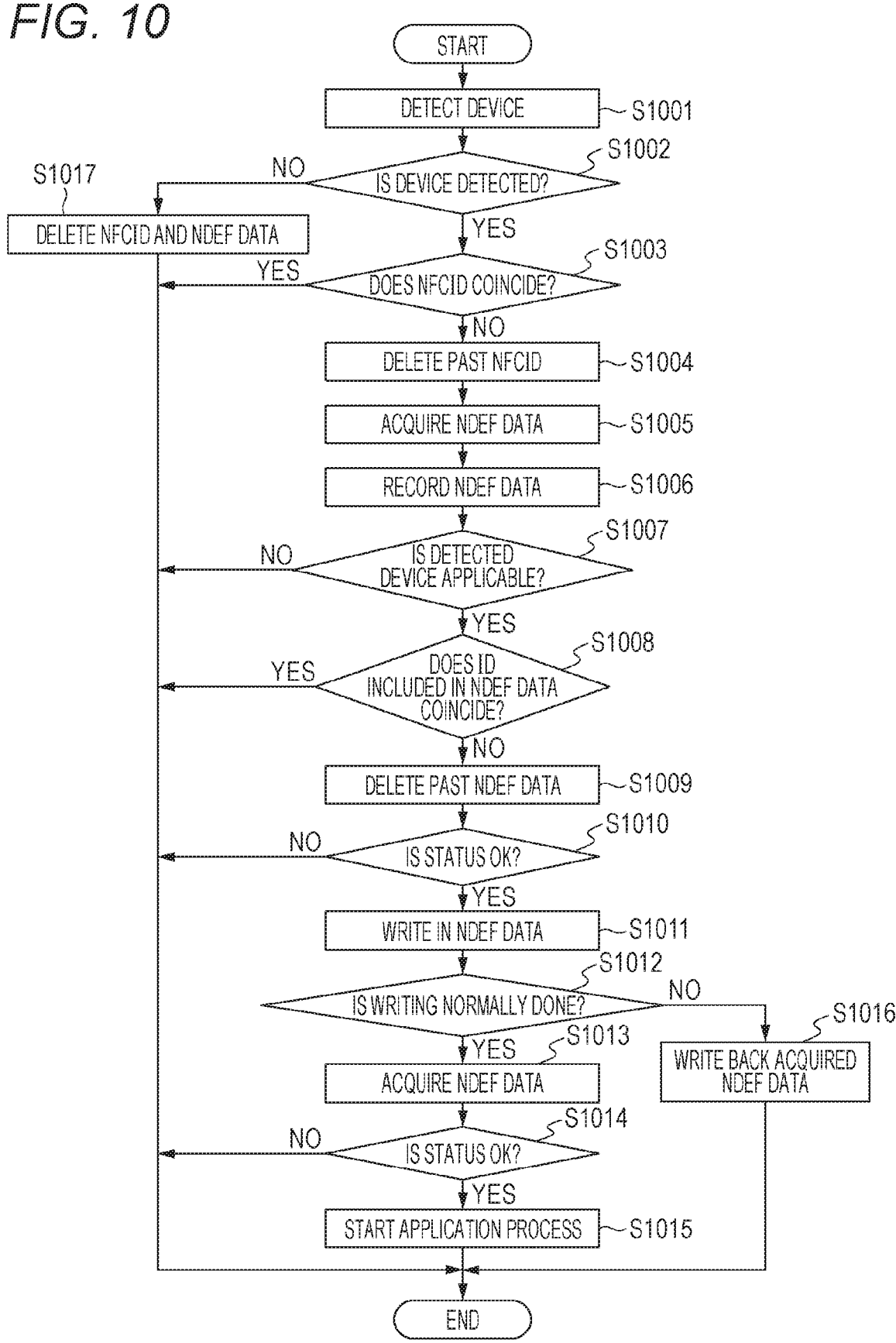
FIG. 10 is a flowchart illustrating the operation of a communication device in a third embodiment.

In this embodiment, the process illustrated in FIG. 10 is executed instead of the process illustrated in FIG. 6 described in the first and second embodiments.

FIG. 10 is a flowchart illustrating the operation of the communication device 100 according to this embodiment.

In S1001, the control unit 101 performs the near-field communication without contact by controlling the near-field wireless communication unit 108 to check if there is an NFC-enabled appliance in the communicable range. Specifically, the control unit 101 transmits the SENS_REQ command, the SENSB_REQ command, the SENSF_REQ command, and the like defined in the NFC communication protocols. Receiving the response to any of these commands indicates the presence of the NFC-enabled appliance in the communicable range. The process in this step corresponds to the process in S301 in FIG. 3.

In S1002, the control unit 101 determines whether the response to the command transmitted in S1001 has been received. Specifically, whether any of the SENS_RES response, the SENSB_RES response, and the SENSF_RES response has been received is determined. If it is determined that the response has been received (Yes in S1002), the control unit 101 determines that there is the NFC-enabled appliance. In this embodiment, the NFCID (Near-Field Communication Identification) included in the response received here is acquired and saved in the RAM 102. If the NFCID read out in S1003, which has been executed in the past, is held, the data read out in this step is recorded while at least the latest piece of the past data is maintained. Note that the NFCID are the character string that the CPU 208a of the near-field wireless communication unit 208 holds temporarily in the register (not illustrated) of the near-field wireless communication unit 208. In this embodiment, once the NFC communication is started, the same NFCID is set until at least the NFC communication is disconnected. In other words, the same NFCID is included in the response from the same electronic appliance as long as the communication device 100 and the electronic appliance 200 remain close to each other. After that, the process advances to S1003. On the other hand, if it is determined that the response has not been received (No in S1002), i.e., there is not the NFC-enabled appliance, the process advances to S1017. The response received in the process in this step corresponds to the response transmitted from the electronic appliance 200 in S302 in FIG. 3.

In S1003, the control unit 101 determines whether the NFCID read out in S1001 coincides with the NFCID which has been read out previously in S1001 and saved in the RAM 102. If coincides, the control unit 101 determines that the electronic appliance 200 remains close, and this flowchart ends without any read access or write access. Differently from the response to the read access, the SENS_RES, the SENSE_RES, and the SENSF_RES responses do not require the readout of the data from the memory 208b. Therefore, the process takes less time of using the bus than the process for responding to the read access. As a result, the conflict of the bus occurs less frequently, thereby enabling the process more smoothly. On the other hand, if the NFCIDs do not coincide, the process advances to S1004.

In S1004, the control unit 101 deletes the NFCID read out in S1001 previously and saved in the RAM 102.

The process in S1005 to S1016 is similar to that of S603 to S614 in FIG. 6.

In S1017, the control unit 101 deletes the NFCID and the NDEF data saved in the RAM 102.

As described above, in this embodiment, whether the appliance is the same is determined by using the NFCID acquired at the timing of the device detection, and this does not require the write access or the read access. Thus, the conflict of the bus occurs less frequently and the process can be performed more smoothly.

Other Embodiment

In the first embodiment, the recorded identification information (the NFCID or IDs included the NDEF data) is deleted if the information does not coincide. The deletion of the identification information is not limited to the above example. For example, the information may be left while the application process is continued or the wireless LAN communication is established. The reason is described below.

In some cases, while the application process is performed through the wireless LAN with the electronic appliance 200 placed on the communication device 100, another appliance comes close to the communication device 100. In this case, the identification information to be read out does not coincide. The electronic appliance 200 is, however, still on the communication device 100. When the identification information of the electronic appliance 200 is read out again, the handover may be attempted again.

In order to prevent this, once the wireless LAN is established or the application process is started, the ID acquired by the read access, which has triggered the wireless LAN, is held until the wireless LAN is disconnected or the application process ends. This can solve the above problem. In this case, a plurality of IDs may be held. If the plural IDs are held and the identification information is read once, the information is compared to each of the held IDs. The IDs may be compared again and deleted after the end of the application process or the disconnection of the wireless LAN communication.

In the first embodiment, the identification information may be deleted if there is not the NFC-enabled appliance in S602. This deletion may be avoided while the application process is continued or the wireless LAN communication is established. This is because of the reason below. While the application process is continued or the wireless LAN communication is established, the user may detach the electronic appliance 200 off from the communication device 100 to the distance out of the NFC possible range. After that, with the wireless LAN still established, the electronic appliance 200 may be placed on the communication device 100 again. In this case, the NFC-enabled appliance is not found in the communicable range according to the device detection but in fact, the electronic appliance 200 is still communicating through the wireless LAN and performing the application process. That is to say, placing the appliance again does not require another handover. The ID is held while the wireless LAN is established and by comparing with this ID, the process can be performed as if the appliance were left on the device 100.

Aspects of the present invention can be embodied by the process in which a program for achieving one or more functions in any of the above embodiments is supplied to a system or a device through a network or a storage medium and read out and executed by one or more processors in a computer of the system or the device. The program can be executed by a circuit with one or more functions (such as ASIC).

According to aspects of the present invention, the process to be executed in accordance with the near-field wireless communication can be controlled as appropriate.

Other Embodiments

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-251269, filed Dec. 11, 2014, which is hereby incorporated by reference herein in its entirety.

What is claimed is:

1. A communication device comprising:
   a first wireless communication unit configured to, via near-field wireless communication, repeatedly read out data recorded in a tag of an external device;
   a second wireless communication unit;
   one or more processors; and
   memory storing instructions that, when executed by the one or more processors, cause the communication device to perform operations comprising:
   storing identification information of the external device included in the data read out by the first wireless communication unit in the memory,
   in response to the first wireless communication unit reading out the data, controlling the first wireless communication unit so that data causing the external device to do a predetermined operation is written to the tag of the external device;
   when the first wireless communication unit reads out the data again and in a case where the data is read out from the external device, controlling the first wireless communication unit so that data causing the external device to do a predetermined operation is not written to the tag of the external device, and
   when the first wireless communication unit reads out the data again and in a case where the data is read out from another external apparatus different from the external device, controlling the first wireless communication unit so that data causing the other external device to do a predetermined operation is written to the tag of the other external device.

2. The communication device according to claim 1, wherein the predetermined operation is an operation for establishing wireless communication between the communication device and the external device through the second wireless communication unit.

3. The communication device according to claim 2, wherein the data causing the external device to do the predetermined operation includes communication parameters for establishing the wireless communication between the communication device and the external device through the second wireless communication unit.

4. The communication device according to claim 3, wherein the second wireless communication unit is controlled to generate a network and the data causing the external device to do the predetermined operation includes an identifier of the network generated by the second wireless communication unit.

5. The communication device according to claim 4, wherein the data causing the external device to do the predetermined operation includes a password for participating in the network generated by the second wireless communication unit.

6. The communication device according to claim 1, wherein the first wireless communication unit attempts to read out data repeatedly even after communication with the external device is established by the second wireless communication unit.

7. The communication device according to claim 1, wherein when it is determined that the identification information included in the data read out by the first wireless communication unit does not represent the same external device as the external device represented by the identification information temporarily held by the memory unit, the identification information of the external device held by the memory unit, is disabled.

8. The communication device according to claim 1, wherein when the external device is moved out of near-field wireless communication range, the identification information of the external device held by the memory unit, is disabled.

9. The communication device according to claim 1, wherein the first wireless communication unit supplies power to the tag of the external device.

10. The communication device according to claim 1, wherein the second wireless communication unit is activated in response to writing of data used to cause the external device to do the predetermined operation in the tag of the external device by the first wireless communication unit.

11. The communication device according to claim 1, wherein the first wireless communication unit is located on a top plane of the communication device.

12. The communication device according to claim 1, wherein the first wireless communication unit detects proximity of the external device by constantly transmitting a detection signal and receiving a response from the external device in response to the detection signal,
   wherein the memory unit temporarily holds another identification information allocated to the tag of the external device included in the response, and
   wherein the operations performed by the communication device further comprise:
   determining whether the another identification information included in the response from the external device received from the first wireless communication unit and the another identification information temporarily held by the memory unit represent the same external device, and
   when it is determined that the same external device is represented, controlling the first wireless communication unit to not read out the data out of the tag of the external device.

13. The communication device according to claim 12, wherein when it is determined that the another identification information included in the response from the external device received by the first wireless communication unit does not represent the same external device, the another identification information held by the memory unit, is disabled.

14. The communication device according to claim 12, wherein when the first wireless communication unit does not detect the proximity of the external device, the another identification information held by the memory unit, is disabled.

15. The communication device according to claim 12, wherein the first wireless communication unit repeatedly transmits the detection signal even after the communication with the external device is established by the second wireless communication unit.

16. A communication device comprising:
   a first wireless communication unit configured to, via near-field communication, repeatedly read out data recorded in a nonvolatile recording region included in a near-field wireless communication unit of an external device;
   a second wireless communication unit;
   one or more processors; and
   memory storing instructions that, when executed by the one or more processors, cause the communication device to perform operations comprising:
   storing identification information of the external device included in the data read out by the first wireless communication unit in the memory,
   in response to the first wireless communication unit reading out the data, controlling the first wireless communication unit so that data causing the external device to do a predetermined operation is written to the tag of the external device,
   the first wireless communication unit reads out the data again and in a case where the data is read out from the external device, inhibiting wireless communication with the external device through the second wireless communication unit, and
   when the first wireless communication unit reads out the data again and in a case where the data is read out from another external device different from the external device, enabling wireless communication with the external device through the second wireless communication unit.

17. A control method for a communication device including a first wireless communication unit configured to, via near-field communication, repeatedly read out data recorded in a tag of an external device and a second wireless communication unit configured to wirelessly communicate with the external device via a different communication method from the near-field wireless communication, the control method comprising the steps of:
   temporarily holding identification information of the external device included in the data read out by the first wireless communication unit; and
   controlling, in response to the first wireless communication unit reading out the data, the first wireless communication unit so that data causing the external device to do a predetermined operation is written to the tag of the external device,
   wherein when the first wireless communication unit reads out the data again and in a case where the data is read out from the external device, the first wireless communication unit is controlled so that data causing the external device to do a predetermined operation is not written to the tag of the external device, and
   wherein when the first wireless communication unit reads out the data again and in a case where the data is read out from another external device different from the external device, the first wireless communication unit is controlled so that data causing the other external device to do a predetermined operation is written to the tag of the other external device.

18. A control method for a communication device including a first wireless communication unit configured to, via near-field wireless communication, repeatedly read out data recorded in a nonvolatile recording region included in a near-field wireless communication unit of an external device and a second wireless communication unit configured to wirelessly communicate with the external device via a different communication method from the near-field wireless communication, the control method comprising the steps of:
   temporarily holding identification information of the external device included in the data read out by the first wireless communication unit; and
   controlling, in response to the first wireless communication unit reading out the data, the first wireless communication unit so that data causing the external device to do a predetermined operation is written to the tag of the external device, wherein when the first wireless communication unit reads out the data again and in a case where the data is read out from the external device, controlling not to wirelessly communicate with the external device through the second wireless communication unit, and wherein when the first wireless communication unit reads out the data again and in a case where the data is read out from another external device different from the external device, controlling to wirelessly communicate with the other external device through the second wireless communication unit.

19. A non-transitory computer-readable storage medium storing computer executable instructions that cause a communication device, the communication device including a first wireless communication unit configured to repeatedly read out data recorded in a tag of an external device via near-field wireless communication and a second wireless communication unit configured to wirelessly communicate with the external device via a different communication method from the near-field wireless communication, to execute a control method, the control method comprising the steps of:

temporarily holding identification information of the external device included in the data read out by the first wireless communication unit; and controlling, in response to the first wireless communication unit reading out the data, the first wireless communication unit so that data causing the external device to do a predetermined operation is written to the tag of the external device, wherein when the first wireless communication unit reads out the data again and in a case where the data is read out from the external device, the first wireless communication unit is controlled so that data causing the external device to do a predetermined operation is not written to the tag of the external device, and wherein when the first wireless communication unit reads out the data again and in a case where the data is read out from another external device different from the external device, the first wireless communication unit is controlled so that data causing the other external device to do a predetermined operation is written to the tag of the other external device.

20. A non-transitory computer-readable storage medium storing computer executable instructions that cause a communication device, the communication device including a first wireless communication unit configured to repeatedly read out via a near-field wireless communication data recorded in a nonvolatile recording region included in a near-field wireless communication unit of an external device and a second wireless communication unit configured to wirelessly communicate with the external device via a different communication method from the near-field wireless communication, to execute a control method, the control method comprising the steps of:

temporarily holding identification information of the external device included in the data read out by the first wireless communication unit; and controlling, in response to the first wireless communication unit reading out the data, the first wireless communication unit so that data causing the external device to do a predetermined operation is written to the tag of the external device, wherein when the first wireless communication unit reads out the data again and in a case where the data is read out from the external device, controlling not to wirelessly communicate with the external device through the second wireless communication unit, and wherein when the first wireless communication unit reads out the data again and in a case where the data is read out from another external device different from the external device, controlling to wirelessly communicate with the other external device through the second wireless communication unit.

* * * * *